Dec. 14, 1926.
G. MOORE
1,610,806
WORD BUILDING APPARATUS
Filed Feb. 24, 1925
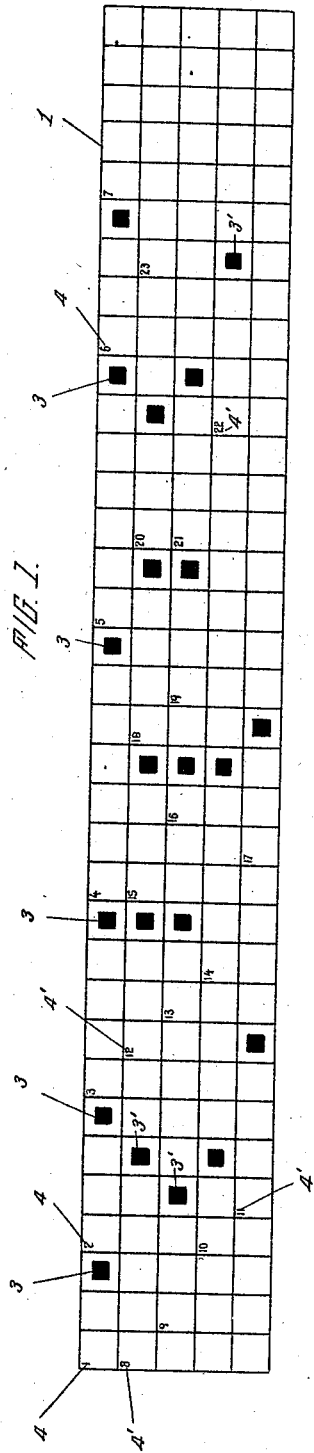
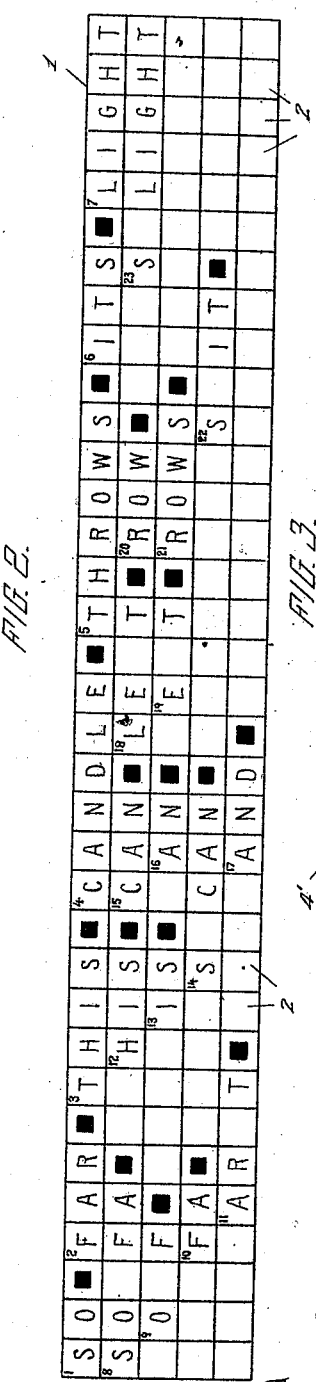
Inventor:
GEORGE MOORE
By Edgar M. Kitchin
his Attorney.

Patented Dec. 14, 1926.

1,610,806

UNITED STATES PATENT OFFICE.

GEORGE MOORE, OF YONKERS, NEW YORK.

WORD-BUILDING APPARATUS.

Application filed February 24, 1925. Serial No. 11,353.

This invention relates to improvements in the apparatus of educational puzzles and has as its primary object vocabulary building.

A more detailed object is the appeal to the interest of the student incident to word building from other words.

With these and further objects in view as will in part hereinafter become apparent and in part be stated, the invention comprises certain novel constructions, combinations and arrangements of parts in the apparatus for word analysis and building as subsequently specified and claimed.

In the accompanying drawings—

Figure 1 is a diagram of a chart incorporating an illustrative embodiment of the invention.

Figure 2 is a similar view of the same with the word building completed.

Figure 3 is a key to the chart seen in Figure 1.

It is now quite the common practice to arrange words in such relation to each other that one letter of one word will form also one letter of another word, and by the discovery of a series of words from their definitions an undiscovered word may be built up, but in carrying out this known or proposed method it is necessary to discover a word for each letter of the undiscovered word. It is an essential part of the present invention to render word discovery interesting by providing for the discovery of more than a single letter of an undiscovered word in the discovery of a word from its definition.

In carrying out the present invention, it is also intended to take advantage of the fact that in sentences or clauses juxaposed words frequently conclude with letters and begin with letters which form a natural assemblage for other words. That is to say, it frequently happens that the last letter of a word in a sentence or the last two or three letters of a word in a sentence may be joined to the first letter, or the first series of letters, of the next adjacent word to form a third word. This may be properly referred to as linking words to build other words.

An illustration of the device preferred by me in embodying the present invention will be found in Figure 2 of the accompanying drawings, which is made up from the chart seen in Figure 1, to which has been added the words whose definitions appear in Figure 3.

Referring to the drawings by numerals, 1 indicates a chart made up of six longitudinal lines and thirty-six cross lines producing one hundred eighty-five squares or blank spaces 2. Of course, the number of lines and cross lines and resulting squares or blank spaces will vary, according to the particular illustration or application of the invention, and will correspond to the number of letters of the words, phrase, sentence or expression selected as the base. In the illustration, I have utilized in the drawing the expression "So far this candle throws its light", and in applying the same to the chart the words are applied to the top line of squares 2 and are separated from each other by any form of appropriate indicia, such as a spot 3 in the square 2 appearing between each two words. The spots 3 will, therefore, indicate to the student or operator the termini of the several words and the beginning of each word is indicated by a key digit, at 4, 4. Thus in Figure 1, the first group of squares 2 on the top line is marked with the key digit or number 1, and consists of two squares. The operator will, therefore, note at once that the word which the key number 1 indicates is a word of two letters. Its meaning being "therefore", the operator will doubtless readily determine that the word is "so". It may be observed that the simplest form of illustration has been utilized in the accompanying drawings for facilitating a ready understanding of the invention, but it is obvious that words may be and frequently will be utilized of such length and character as to not be easily discoverable, and when that occurs, means of discovery is provided on the chart as seen in Figure 1 plus the key as found in Figure 3 as will be hereinafter stated. The space for the second word of the basic expression as found in the top row of squares 2 in Figure 1 is made up of a group of three squares beginning with the key number 2 and ending with the square just preceding the square containing the second spot 3 of the top row. The space for the third word begins with the key number 3 and is made up of four squares 2 ending with the square preceding the third spot 3. The space for the fourth word is made up of six squares 2 beginning with the square bearing the key number 4 and ending with the square preceding the square having the fourth spot 3, and so on throughout the balance of the top line or row of squares 2. It should be obvious that while for the sake of symmetry the squares provided with the spots 3 have been made the same size as the other squares, they could be made smaller or otherwise less accentuated so long as the termini of each of the words in the top line or row is clear. One objection to the utilization of a full width square 2 resides in the fact, as will be apparent by reference to Figure 2, that all of the built-up words of the link form have some of their letters spaced apart a distance equal to the width of the square occupied by the particular spot 3 above. Reduction in the extent of this space may be easily provided to cause the letters of the link words to be more nearly uniformly spaced, or this space may be entirely eliminated and other indicating means substituted, such as a heavier vertical spacing line.

The horizontal rows of squares 2 below the top row are divided into word spaces y spots 3', 3', to indicate the termini of the several assisting words (from which the words of the top row are to be built or discovered), the beginning of each of said assisting words being indicated by a key digit or number 4', after the manner of the arrangement of the key numbers 4 and spots 3. Thus it will be seen that the first word appearing in the second line or row of the chart of Figure 1 begins in the square 2 bearing the key number 8 and that such word has four squares 2 with an interposed square beneath the first spot 3 of no significance. The key number 8 being in the square 2 immediately beneath the square bearing the key number 1, it will be apparent that the first letter of the word indicated by the key number 8 is the same as the first letter of the first word of the top row. Therefore, if the operator cannot determine what the first word should be of the top row, he may look at the definition referred to by the key number 8, and finding it to be "a couch", he may try to discover a word of the four letters meaning "a couch". Finding them to be a "sofa", he places the letters "so" in the first two squares of the second row; skips the square beneath the first spot 3, and places the second two letters of the word in the next two squares. He will thereby have discovered the first word of the top row and the first two letters of the second word. In the particular illustration employed, this discovery will also give him the word indicated by the key number 9, and also the word indicated by the key number 10. Obviously, a converse process of discovery may be utilized, and the operator may seek for the word indicated by the key number 10 beginning a musical note, and finding it to be "fa" can work backward using the first letter of "fa" as the last letter of the word indicated by the key number 9, which meaning "relating to" would naturally be "of". It will be obvious, therefore, that the developing of the several words may occur in any order or sequence and that the keys 4' may be utilized to discover the key words for the key digits 4, or vice versa. It will be observed that in the illustration employed the first two words of the top line or row afford the two link words "sofa" and "of". The second two words of the top line or row afford the link word "art". The third two words of the top line or row afford the link word "scan". The fourth and fifth words of the top line or row afford the link words "let" and "et". The fifth and sixth words of the top line or row afford the link word "sit", and the sixth and seventh words of the top line or row afford the link word "slight", in this instance the entire last word being utilized as part of the link word. In addition to the link words and the words of the basic expression or top row words being mutually helpful in enabling discovery, the one of the other, other words built from the body of the several words of the basic expression or top row words may be provided as indicated for supplemental assistance to the operator.

It will be apparent from the foregoing explanation and the chart with the key and completed illustration of the drawing that the linking of the letters to form new words may be carried out to a greater or less extent to almost any limits, including in some instances the incorporation of the entire of an intermediate word with the adjacent terminals of the preceding and succeeding words. For example, the words "hat and emblem" afford the linking word "tandem", embracing the entire intermediate word "and," the last letter of the first word, and the first two letters of the last word. The simple, elemental presentation in the embodiment disclosed in the drawing must be understood as offered solely for facility of disclosure of principle and not as suggesting limitations in the actual scope of the invention or its possibilities in the developing and enlarging of vocabularies of operators or students, since the possibility of the use of prodigious words and technical terms is practically limitless.

What is claimed is:—

1. In word-building apparatus, a chart having means indicating the number of letters of an unknown word to be discovered from its definition, and means indicating the number of letters of a second unknown word to be discovered from its definition and made up of letters of the first unknown word and in the same sequence as therein appearing.

2. In word-building apparatus, a chart having means indicating the number of letters of an unknown word to be discovered from its definition, and means indicating the number of letters of a second unknown word to be discovered from its definition and made up in part of letters of the first unknown word and in the same sequence as therein appearing.

3. In word-building apparatus, a chart having means indicating the number of letters of unknown consecutive words to be discovered from their definitions, and means indicating the number of letters of an unknown word to be discovered from its definition and made up of letters from the consecutive unknown words and in the same sequence as therein appearing.

4. In word-building apparatus, a chart comprising divisions creating superimposed lines of letter-receiving spaces, word termini indicia at points along one of the lines of such spaces corresponding with the termini of words whose letters correspond in number to and are adapted to be arranged in said spaces, and word termini indicia for the other lines of spaces indicating the termini of words built up from the lettering of the words from the first line in the same sequence.

5. In word-building apparatus, a chart comprising divisions creating superimposed lines of letter-receiving spaces, word termini indicia at points along one of the lines of such spaces corresponding with the termini of words whose letters correspond in number to and are adapted to be arranged in said spaces, and word termini indicia for the other lines of spaces indicating the termini of words built up from the lettering of the words from the first line in the same sequence, some of the last-named word termini indicia being spaced to cause the lettering to be received within the limits thus indicated to comprise letters from a plurality of juxtaposed words.

In testimony whereof I affix my signature.

GEORGE MOORE.